United States Patent [19]

Ledford

[11] Patent Number: 5,095,040
[45] Date of Patent: Mar. 10, 1992

[54] PROCESS FOR CONVEYING OLD RUBBER TIRES INTO OIL AND A USEFUL RESIDUE

[76] Inventor: Charles D. Ledford, P.O. Box 1088, Hawthorne, Fla. 32640

[21] Appl. No.: 653,395

[22] Filed: Feb. 11, 1991

[51] Int. Cl.$^5$ .............................................. C08J 11/04
[52] U.S. Cl. ...................................... 521/40.5; 521/41; 521/45.5
[58] Field of Search .................. 521/45.5, 41, 40.5

[56] References Cited

U.S. PATENT DOCUMENTS

| | | | |
|---|---|---|---|
| 3,823,223 | 7/1974 | Liska et al. | 521/45.3 |
| 3,873,474 | 3/1975 | Ficker | 521/45.5 |
| 4,146,508 | 3/1979 | Maxwell | 521/45.5 |
| 4,469,817 | 9/1984 | Hayashi et al. | 521/45.5 |
| 4,665,101 | 5/1987 | Ficker | 521/45.5 |

Primary Examiner—Paul R. Michl
Assistant Examiner—Andrew E. C. Merriam
Attorney, Agent, or Firm—Lawrence I. Field

[57] ABSTRACT

Old rubber tires are physically shredded and a sized fraction of the shreds is fed into a heated rotating stainless steel tube in which the temperature is carefully controlled so that the shreds are converted to a char and a No. 4 oil product both of which are separately recovered.

10 Claims, 2 Drawing Sheets

PROCESS FOR CONVEYING OLD RUBBER TIRES INTO OIL AND A USEFUL RESIDUE

This invention relates to a process for converting old rubber tires into useful products. The disposal of old rubber tires is an increasingly important problem as landfills become more expensive and less available and as State and Federal laws ban the uncontrolled burning of tires because of noxious products which pollute the atmosphere.

The present invention provides a relatively simple and inexpensive process wherein old rubber tires are converted into useful products. In this specification the term rubber is intended to include both natural rubber and synthetic rubber, In the process, the old tires are first physically disintegrated by conventional shredding and grinding means so that coarser pieces or shreds, metals and other non-rubber content of the tires may be separated from the desired finely divided rubber which is recovered in the form of crumbs smaller than ⅜ or ¼ inch in size.

Preferably an oscillating screen is used to separate any coarser pieces from the desired fine rubbery crumb which comprises the preferred feed material for the process of this invention.

The recovered finely divided rubber crumb is conveyed to a hopper where it is stored until it is processed in the next step of the process. From storage, the rubber crumb recovered after screening is fed into a rotary reactor by means of a variable pitch, variable speed auger which provides means for controlling the rate of feed into the rotary reactor.

The rotary reactor preferably comprises a stainless steel tube having lifters on the inner surface of the tube as are common in rotary kilns. The tube is disposed at an angle of between 5° and 10° to the horizontal inside a shell which serves as a support for the reactor tube. Also, inside the shell are several banks of burners which heat the exterior of the reactor tube and its contents. The burners are individually controlled so that each portion of the reactor tube may be kept at the temperature desired for the specific chemical reaction which is to take place at that location in the reactor, so that the reactions in which the rubber scrap participates occur in a specific sequence.

Sensing means are provided in the reactor for the purpose of determining the temperature at closely spaced points along the length of the reactor. The individual burners are controlled to maintain the tube wall temperatures in the reactor at the desired value.

The ground rubber crumbs are fed into the entry end of the reactor in such a way that a minimum amount of air is carried into the upper end of the inclined tube with the rubber crumb, for example through an air lock.

A positive pressure of two to four inches of water is maintained in the reactor tube so as to minimize any air infiltration into the reactor tube. The entry end of the reactor is maintained at a temperature between 900° and 1000° F. At these temperatures the rubber begins to carbonize and gaseous and liquid products are evolved from the rubber as it descends toward the exit end of the rotating reactor tube. The tube is inclined downwardly from the entrance end toward the exit end of the tube, an inclination of between 5° and 10° being sufficient for travel of the material being processed.

The smoke evolved from the heated tire scrap is condensed as it rises through a packed tower connected to the upper end of the tube. A liquid condensate descends in the tower to a recover means where the liquid and the condensed smoke are collected and withdrawn from the apparatus.

The atmosphere in the reaction tube consists principally of the gases which evolve from the rubber crumb as it is heated, and the process takes place in the virtual absence of air. In this respect it differs from processes in which the old tires are treated in an inert atmosphere or in a vacuum and from processes in which the old tires are treated in the presence of air or other oxygen containing gases.

The invention will be better understood from the description which follows taken in conjunction with the drawings in which.

Figure 1:
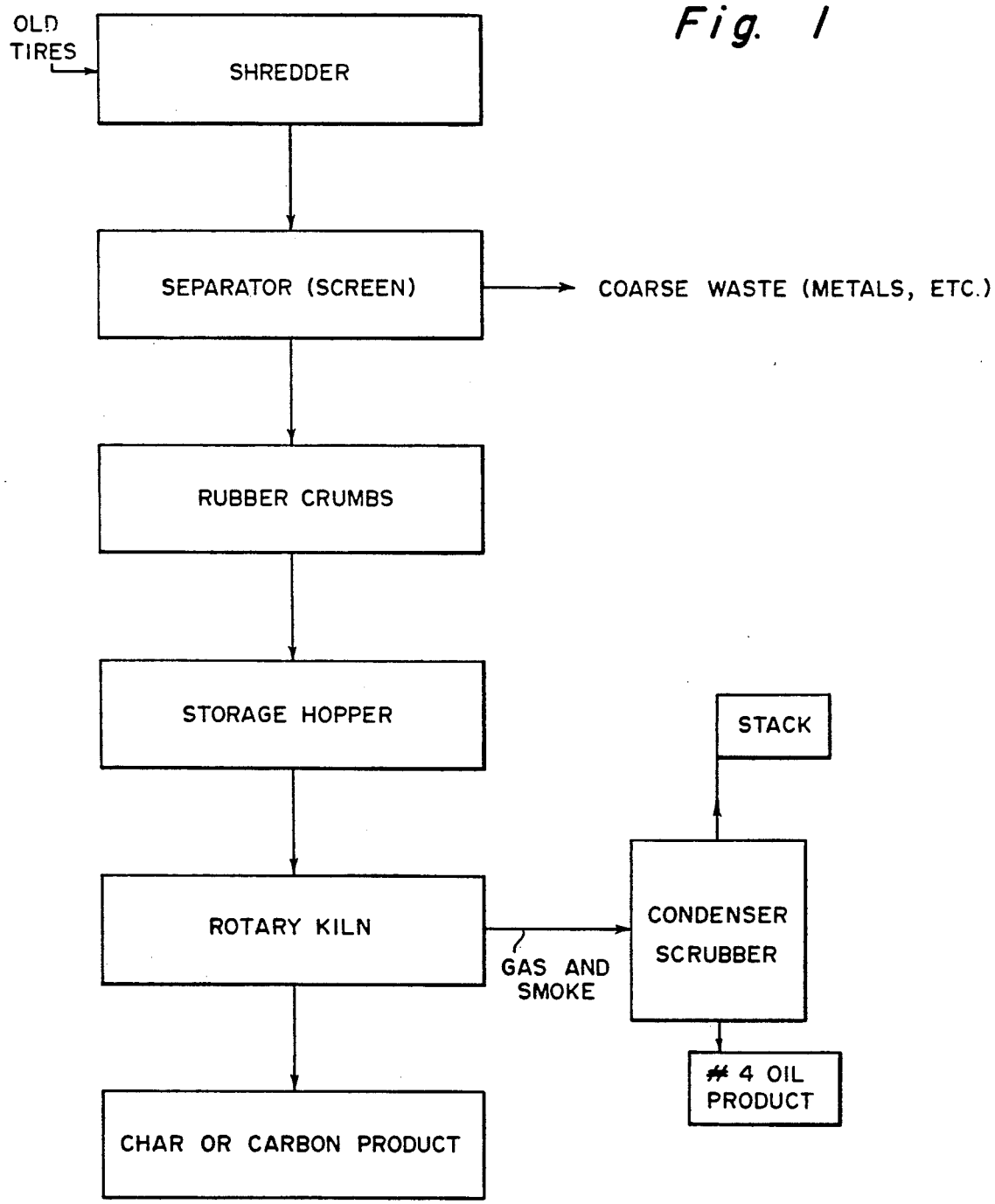
FIG. 1 is a schematic flow sheet representation of the process.

As may be seen in FIG. 1 in the process of this invention old tires are shredded in a conventional shredder. The resulting material is stored in a bin or hopper or fed to an oscillating screen or other device for separating the coarse oversize material from the desired fines, which are between ¼ and ⅜ inch particles. Any metal or other non-rubber scrap pieces are also separated from the shredded product, leaving only rubber crumb particles in the desired size range. These are conveyed to a storage hopper.

The crumb is introduced into the upper end of an inclined stainless steel tube rotary kiln where the particles are quickly heated to a temperature at which they decompose into solid, liquid and gaseous products. The liquids vaporize and the resulting mixture of gaseous products and vaporized liquid travels to a condenser and thence to an exhaust stack. The solids, a carbonaceous char, travel down the tube and are discharged at the lower end of the tube.

Figures 2, 3:
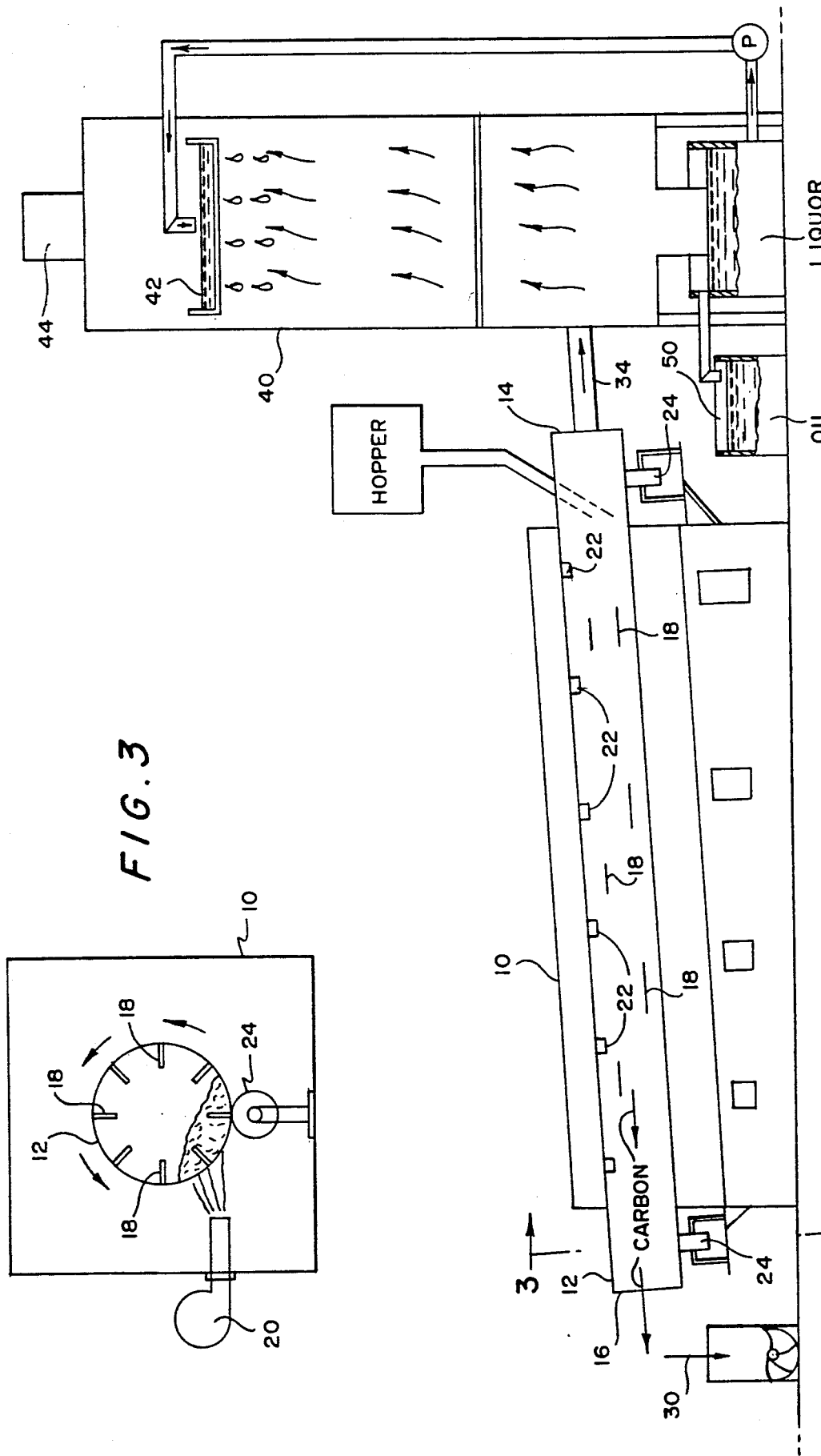
FIG. 2 is a side view of an apparatus for carrying out the invention.
FIG. 3 is a view partly in section taken on plane 3—3 of FIG. 2.

FIG. 2 shows an apparatus for carrying out the process, after the rubber crumb particles have been prepared. The apparatus includes a casing 10 in which a rotary kiln—stainless steel tube 12 is housed.

Tube 12 is supported so that it is inclined from a higher elevation at the entry end 14 to a lower elevation at the discharge end 16. Lifters 18 extend from the inside of tube 12 and assist the travel of the rubber crumb from its entry into tube 12 to its exit. They lift the crumb so that it is not only heated by the tube 12, but also by the gases present in tube 12.

A number of burners 20 are positioned beneath tube 12 and heat the tube. Sensors 22 mounted on the tube 12 measure the temperature along the tube and depending on whether additional heat is needed to maintain a desired temperature profile along the tube, they activate controls for the individual burners 20.

The solid residue, a carbonaceous char 30 is discharged at the lower end of tube 12 after all of the gaseous products have evolved from the crumb.

The gases flow upwardly along tube 12 and from the tube they exit to a condenser scrubber 40 in which they are scrubbed with a liquid 42 which is preferably an oil condensed from the gases evolved from the rubber crumb. The uncondensed portion of the gases passes out of the apparatus to a stack 44, unless the gas composition is such that it can be burned, in which case it is fed to one or more of the burners 20 to furnish heat to tube 12.

The scrap rubber consists of three principal components identified generally as a butyl rubber, oil, and carbon black, and while not wishing to be bound by any specific theoretical explanation of what occurs in the reactor, it is believed that when the crumbs enter the entry end of the reactor which is maintained at 900° to 1000° F., the first reaction which occurs is the carbonization of the rubber, along with the evolution of #4 oil. It has been found that the temperatures of the reactor must be maintained within very narrow ranges which are critical, in order that the reaction occur in proper sequence so that the smoke product has the desired properties. Therefore the burners in the shell which heat the reactor tube, are caused to open or close to provide more or less heat in order to maintain the required temperature at the entry zone of the reactor. Since the reactions which occur as the rubber is carbonized are exothermic in part, the sensing means in the reactor will reduce the fuel feed to the burners so that their output plus the heat generated in the reactor will suffice for the temperature to be from 900° to 1000° F.

The smoke produced and the reactions which occur in the reactor are affected by the amount of air present. The reactor tube is connected to the rubber crumb supply through a tightly sealed joint so that no air can enter the reactor except that entrained by the rubber crumb as it is fed into the rotating tube. Furthermore, the tube is maintained under a slight positive pressure to minimize infiltration of air into the reactor, by leakage through any openings which may exist.

Temperatures along the length of the reactor are monitored by temperature sensors so that at the entry end 14 the temperature is maintained at about 900° F., in the middle section 18 the temperatures are held at about 900° F. and at the exit or discharge end 16, the temperature is between about 800° F. and 825° F.

The reactor is inclined at an angle of about 5 degrees, the upper end being the end into which the rubber particles enter and the lower end being the end in which the carbon products exit. Means 24 to rotate the reactor at any desired speed are provided. A reactor has been successfully operated with a rate of rotation of about 3 rpm for a tube 24" in diameter and 7/16" thick and 20.76 feet long equipped with eight 3" lifters to advance the rubber crumbs along the length of the reactor. The carbon which is the solid product produced in the reactor is discharged without quenching since it is at a sufficiently cool temperature that it does not catch fire and burn.

The smoke 34 leaves the reactor at between 325° F. and 375° F. and passes into a packed tower 40 through which an aqueous liquid 42 containing condensed oil is recycled at a temperature of about 150° F. The oil collects on top of the recycled liquid and runs off into a holding tank 50. The oil that is recovered is pumped from an overflow tank to a storage tank for settling. The oil has a heating value of approximately 18,000 btu per pound, a specific gravity of 0.90, a pour point of −7° C., and a boiling point of 112° C.

The smoke 34 moves through the upper end 14 of the tube 12 into a packed tower 48 with liquid circulating through the tower in a counter current flow. As the smoke rises in the tower at 350 degrees the liquid 42 descends at approximately 140°-160° F., condensing the smoke into a liquid oil.

The present process differs from pyrolysis in that air is not allowed to enter the inside of the tube where the rubber is carbonizing. The external heat on the tube is about 900-1100 degrees. This is enough heat to keep the rubber carbonizing. During operation the atmosphere inside the tube is maintained at approximately 2-3" water pressure.

The present process depends on admitting the ground rubber into the tube with very little air and recovering the smoke in a condenser where the smoke is condensed into a #4 oil. By feeding ground rubber to a rotary reactor an end product of carbon is recovered which is more valuable and of a higher grade than the carbon recovered from whole or chipped tires (4×4").

The present process in which crumb travels freely along the tube is an improvement over processes in which scrap tires are shredded and are conveyed by belts or by a screw through a furnace, because the rubbery material exudes a sticky or semisolid gummy exudate which clogs the belt or causes the screws to become stuck. The apparatus used is much simpler than the apparatus utilized in fluidized bed processes for treating scrap tires. In the process of the present invention the crumb enters at the high end of a stainless steel tube, is heated by direct contact with the tube and is propelled by lifters which are welded to the inside of the tube. As a result, no accumulation of tar or gummy material is experienced in the process.

I claim:

1. A process for recovering valuable products from scrap rubber tires which comprises:
   shredding said tires and separately recovering a first portion consisting principally of rubber crumb particles smaller than ¾ inch in size and a second portion comprising metallic and non rubbery shreds,
   charging said rubber crumb into an inclined heated rotating tube having an entry end at a first elevation and an exit end at a second elevation lower than the elevation of said entry end and maintained at a slight pressure above atmospheric pressure so as to minimize air infiltration into said tube,
   rapidily heating the rubber crumb charged into said tube to a temperature between 800° F. and 1000° F. at which it decomposes into a gaseous product and a solid residue,
   and condensing a portion of said gaseous product and recovering a liquid condensate from said condensed gaseous product 2. The process of claim 1 in which the rubber crumb is maintained at a temperature between 800° F.-1000° F. while in said tube.

3. The process of claim 1 which includes in addition controlling the temperature along the length of the rotating tube by sensing the tube temperature and adjusting the heat supplied to product a desired temperature profile in said tube.

4. The process of claim 1 including recovering a solid residue which is a porous solid carbon product.

5. The process of claim 1 including using the condensed liquid to scrub gases exiting from the rotating tube.

6. The process of claim 1 in which the rotating tube is inclined at between 5° and 10° to the horizontal and crumb is heated by direct contact with tube.

7. The process of claim 1 in which the crumb is in form of pieces ¼-1/78 inch in size.

8. The process of claim 1 in which the crumb passes through tube in 7 to 8 minutes.

9. The process of claim 1 in which separation step includes magnetic separation of magnetizable metal particles.

10. The process of claim 1 in which at least a portion of the exit gases are collected and burned under the tube.

* * * * *

UNITED STATES PATENT AND TRADEMARK OFFICE
CERTIFICATE OF CORRECTION

PATENT NO. : 5,095,040

DATED : Mar. 10, 1992

INVENTOR(S) : Charles D. Ledford

It is certified that error appears in the above-identified patent and that said Letters Patent is hereby corrected as shown below:

On the Title page, in the Title, correct "CONVEYING" to read --CONVERTING--

Col. 1, line 1, correct "conveying" to read --converting--

Col. 2, line 2, correct "recover" to read --recovery--

Col. 4, line 60, correct "1/4-178" to --1/4 - 1/2--

Signed and Sealed this

Fifteenth Day of June, 1993

Attest:

MICHAEL K. KIRK

Attesting Officer

Acting Commissioner of Patents and Trademarks